Aug. 20, 1946.   C. T. BOONE   2,406,058
COTTON HARVESTING MACHINE
Filed Sept. 3, 1943   3 Sheets-Sheet 1
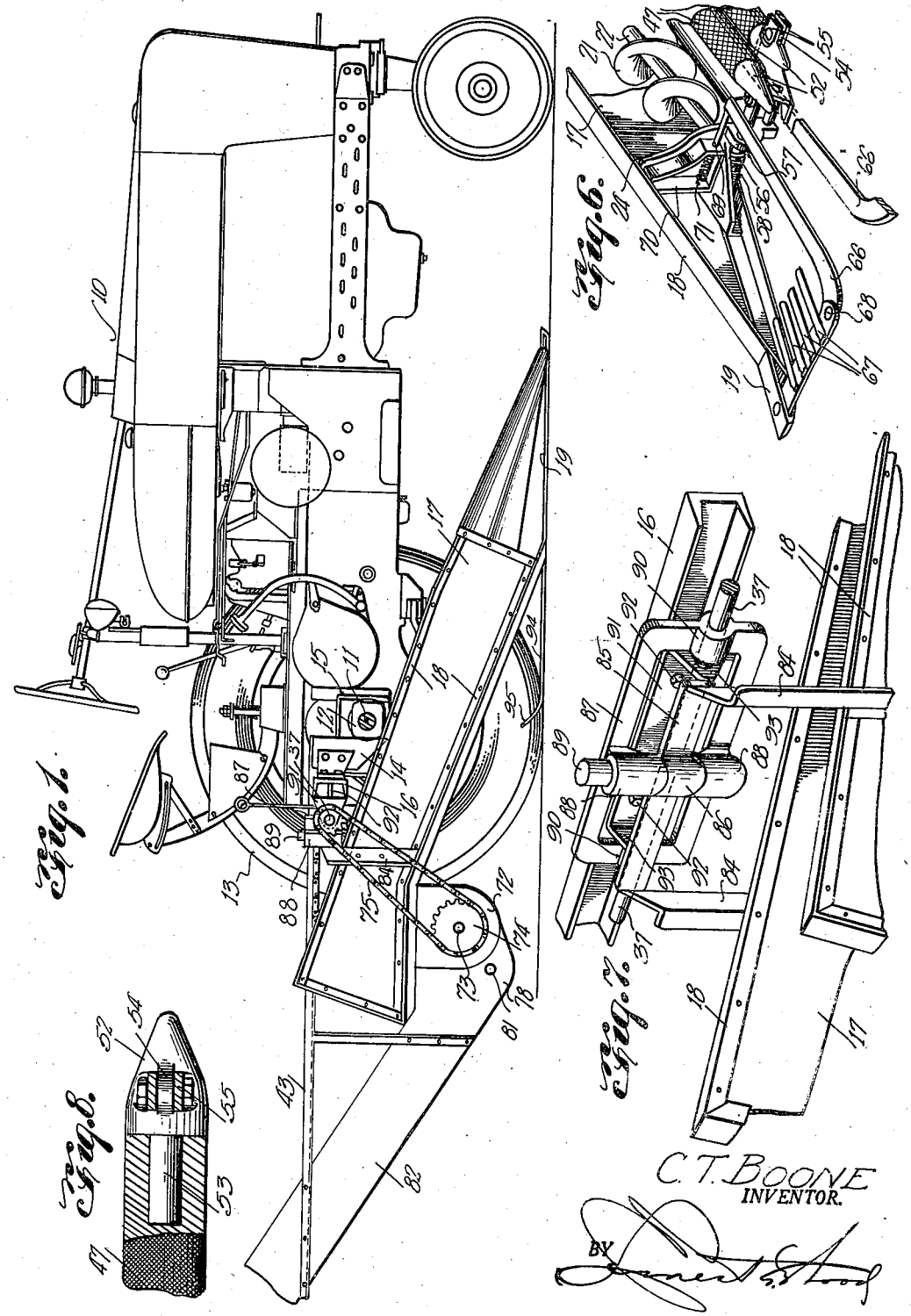

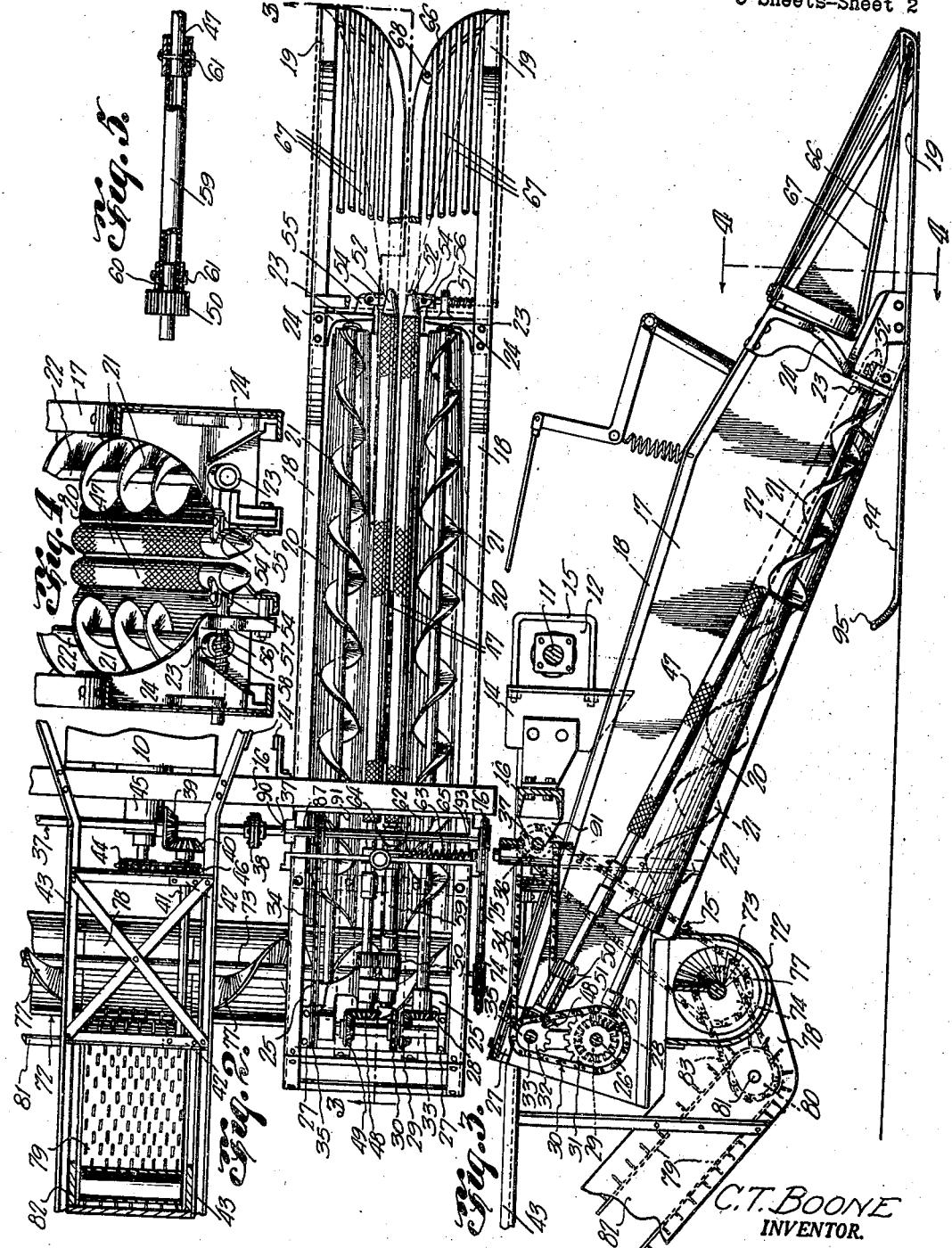

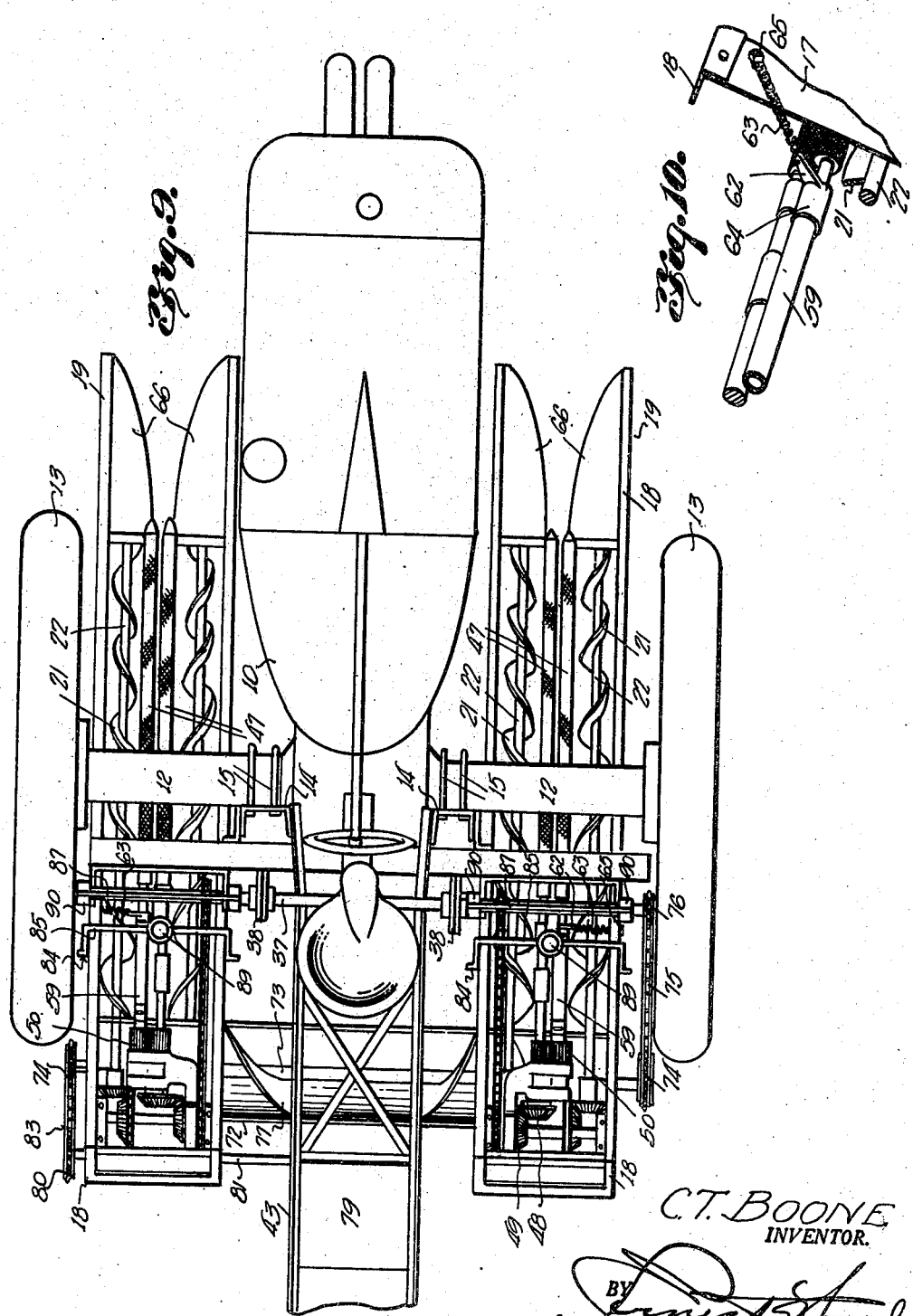

Patented Aug. 20, 1946

2,406,058

UNITED STATES PATENT OFFICE 2,406,058

COTTON HARVESTING MACHINE

Claude T. Boone, Sr., Dallas, Tex.

Application September 3, 1943, Serial No. 501,070

9 Claims. (Cl. 56—33)

This invention relates to cotton harvesting machines and it has particular reference to that type of cotton harvesting machine which strips stalks of cotton.

The principal object of the invention is to provide a stripping unit which, with an identical unit, is designed to be mounted on a farm tractor with the rear axle of the tractor as the suspension point and provided with means by which it may freely oscillate on its suspension in order that the row of cotton stalks alone, as they enter into the operative range of the stripping mechanism, will orient the unit and maintain it in operative position relative to the row thereby minimizing the requirement for diligent accuracy on the part of the tractor operator in steering the machine.

Another object of the invention is to provide a cotton stripping machine whose primary stripping elements consist of elongated, relatively parallel rollers having knurled surfaces, between which the cotton stalks are constrained to pass and these rollers, revolving in opposite directions are effective to remove the cotton from the stalks, along with some foliage, the rollers being each attended by a conveyor designed to receive and transport the harvested material to a point of disposal.

Another object of the invention is to provide means adjacent each end of one of the rollers to permit limited lateral displacement thereof relative to its companion roller to accommodate stalks therebetween of various sizes and further, to provide flight conveyors gradually diminishing in diameter towards their forward ends or in other words, tapered, in order that the forward ends of their shafts may be journaled in bearings in close proximity to the ground and yet insure maximum efficiency of the conveyors.

With the foregoing objects as paramount, the invention has particular reference to certain features of accomplishment, to become manifest as the description proceeds, taken in connection with the accompanying drawings, wherein:

Figure 1 is a side elevational view of a tractor with one rear wheel removed to show the position of one of the stripping units of the invention.

Figure 2 is a plan view, showing one of the stripping units and fragmentarily showing the rear transverse conveyor.

Figure 3 is a view of the stripping unit in longitudinal section taken on line 3—3 on Figure 2.

Figure 4 is a fragmentary front view in vertical section on line 4—4 on Figure 3.

Figure 5 is a detail view partly in section, showing the flexible coupling for one of the stripping rollers.

Figure 6 is a fragmentary detail view of the front end of the stripping unit showing the yieldable mounting for the forward end of the displaceable stripping roller.

Figure 7 is a fragmentary perspective view of the supporting beam and illustrating the suspension mounting for the stripping units.

Figure 8 is a fragmentary view of one of the stripping rollers, showing its deflector head and bearing.

Figure 9 is a top plan view, showing the relationship of the stripping units to a tractor, and Figure 10 is a fragmentary perspective view of the rollers at their upper ends, showing the resilient coupling of one roller and the mechanism by which the latter is maintained in spaced relation to the companion roller.

Continuing with a more detailed description of the drawings, reference is primarily made to Figure 1 wherein 10 denotes a tractor and 11 its rear axle. Two of the stripping units of the invention are employed and are designed to be suspended from the rear axle housing 12 on each side of the tractor between the body thereof and rear wheel 13 so that two rows of cotton stalks may be stripped simultaneously. With this in view, a bracket 14 is first mounted by means of U-bolts 15 to the axle housing 12 and to this bracket is bolted a channel iron beam 16 which extends transversely across the tractor at its rear, between the wheels 13. Further reference to the mounting will be made presently.

Each stripping unit consists of a trough-like structure 17, made up of an angle iron frame 18 and sheet metal side walls. The frame is disposed on an inclined plane and is so shaped at its forward end as to provide runners or skids 19 which slide upon the ground as the tractor is driven down the rows of cotton. The ends of these runners are curved upwardly to allow them to ride over minor obstructions but for the most part, the fields in which the machine is particularly designed to operate are devoid of any serious obstructions.

The underside of the frame is provided with conveyor troughs 20 on each side which extend the major part of the length of the frame. These troughs are spaced apart to define an open, central area through which cotton stalks pass as the machine traverses the row.

Within each trough 20 is disposed a flight conveyor 21, mounted on a shaft 22. It will be observed, especially in Figures 2 and 3 that the conveyors 21 become increasingly smaller in diameter towards their forward ends. This feature is important in that the forward ends of the conveyors may operate quite close to the ground to be effective to receive cotton extracted from the stalks adjacent the ground.

The conveyor shafts 22 are journaled at their forward ends in bearings 23 in special castings 24 mounted in the front end of the frame 18. The rear ends of the shafts 22 are supported in specially constructed brackets 25 at the rear of the machine.

The conveyor shaft 22 and consequently the conveyors 21 are operated from a short transverse shaft 26 near the rear of the frame 18. This shaft does not extend entirely through the frame 18 since the ends thereof are supported in bearings carried by the brackets 25 and the latter, in turn, are suspended by hangers 27 depending from the top of the frame, as shown in Figures 2 and 3. A bevel gear 28 is mounted on the end of the shaft 22 and engages a similar gear 29 on the shaft 26 and through the medium of a chain 30, surrounding a sprocket 31 on shaft 26 and a sprocket 32 on another and parallel shaft 33 above shaft 26, the latter shaft is driven.

The shaft 33, as will become apparent presently operates the stripper rollers to be later identified and described. In the meantime, it is pointed out that this shaft is driven by a chain 34, surrounding a sprocket 35 thereon and another sprocket 36, mounted on a shaft 37 which extends coaxially with the channel iron beam 16 across from one side of the tractor to the other and serves to provide operating power for both stripping units. For convenience in assembling, this shaft 37 is made in axial sections, joined together by the union 38, shown only in Figure 2.

To impart rotation to the shaft 37, a gear 39 is mounted thereon, as disclosed in Figure 2, which meshes with a gear 40, the latter being mounted on a right angular shaft 41. This shaft is mounted in bearings 42 in a frame 43, designed to support the lateral conveyors, which will be identified and described presently. A chain 44 from a sprocket mounted on the power take-off 45 to another sprocket 46, mounted on shaft 41, drives the latter. In this manner, all of the moving elements of the assembly are operated.

Referring now to the stripping mechanism, it is pointed out that two rollers 47 are provided, one being arranged on each side of the opening centrally of the stripper frame and between the conveyors 21. These rollers are preferably roughened as by knurling the major part of their length in order that they will have a better purchase on the material of the stalks passing therebetween. One of these rollers is constrained against other than rotary movement while the companion roller may yield laterally both at the top and bottom. The former roller has a beveled gear 48 on its rear end which engages and is driven by a similar gear 49, mounted on the shaft 33. The rollers have a pair of cooperating pinions 50 near their rear ends and since one roller is driven through enmeshed gears 48 and 49, the companion roller is driven in an opposite direction through the pinions 50. A special casting 51 (Fig. 3) affords a bearing support for the rear ends of the rollers 47.

The forward ends of the rollers 47 are of special design in that they must not possess any protuberances likely to interfere with the passage of the cotton stalks therebetween. Accordingly, coniform or bullet shaped heads 52 which are in themselves secured against rotation but are provided with stems 53 (Fig. 8), the stems entering conforming bores in the ends of the rollers, as shown, thereby serving as bearings for the forward ends of the rollers. The heads 52 are each formed with a projecting ear 54.

The roller 47 which is not permitted to yield laterally is held against such movement at its forward end by reason of its ear 54 being secured in a bifurcated projection 55 integral with one of the castings 24 in the forward end of the frame 18. However, the companion and displaceable roller has its ear 54 connected pivotally to a rod 56, (Fig. 6), the latter extending laterally through an aperture in a projection 57 on the opposite end casting 24 and is surrounded by a compression spring 58 which resists axial movement of the rod 56 and, of course, the lateral movement of the roller.

It is highly important for efficient operation that the described lateral displacement of at least one of the stripping rollers be provided for, due to the wide variation in the diameter of the stalks encountered. It is of equal importance that such displacement be permitted the full length of the roller but through separate agencies in order that the displacement will not occur simultaneously throughout the length of the roller. In other words, an exceptionally large stalk entering between the rollers at the forward end should not act to displace the rearmost end of the roller inasmuch as stalks intermediate the ends of the rollers would escape proper stripping action. At the same time and for the same reason, a large stalk emerging from the rearmost ends of the rollers should have no effect to widen the space between the rollers at their forward ends. To insure against such an eventuality, a flexible coupling is made in one of the rollers between the drive (pinions 50), and the roller proper. This coupling is shown in detail in Figure 5 and consists of a flexible tube 59, preferably of a material having the characteristics of rubber and having one end joined to the stub shaft 60, integral with pinion 50, by means of a T-bolt 61. The opposite end of the coupling is similarly attached by a T-bolt 61 to a reduced end of the roller.

It is apparent that through this coupling 59, the roller can be rotated as effectively as if the coupling were rigid but it permits the roller to yield to any regularities in sizes of stalks which not only prevents clogging of the machine but also promotes more thorough stripping of the stalks with less trash content.

In order to prevent interference between the rollers, due to the flexible coupling 59, provision is made in the form of an arm 62 and a connecting spring 63 (Fig. 2) to hold the yieldable roller away from its companion. The arm 62 is connected to and extends upwardly from a collar 64, mounted on a reduced part of the roller and the spring 63 extends from this arm to a bracket 65, mounted on the side of the machine frame 18 and constantly maintains the arm and consequently the roller under lateral tension, thereby insuring normal uniformity of the space between the rollers.

At the forward end of the frame 18 there is provided a pair of opposed guide aprons which consist of strips 66 which are curved inwardly from the outer ends of the sides of the frame 18 and are disposed in spaced relationship in alignment with the stripping rollers 47, in order that stalks will be engaged and guided thereby into the space between the rollers. A series of strips or small diameter rods 67, extending from end to end of the guides, serve to facilitate the movement of material into the operative range of the stripping mechanism.

It will be observed, especially in Figure 6 that one of the strips 66 forming a guide is adapted to yield to minor obstructions such as large stalks. To provide for this, the guide strip attending or in alignment with the yieldable stripping roller just described, is made in two parts, which are pivoted together at 68 so that the longitudinally extending part will be capable of inward movement. In order to control this movement, a pin 69 is affixed at one end to the rear end of the longitudinal guide 66 and extends laterally through an aperture in a frame 70, mounted upon one of the special end castings 24, and a compression spring 71 surrounds the pin 69 to return it and the guide to their original positions when displaced, as by a large stalk passing between the parallel guide members 66. This particular arrangement, which is illustrated exclusively in Figure 6 has been deleted from the other figures, such as Figures 3 and 4 for clarity.

Referring now to the transverse conveyors and their operating means, it will be observed in Figure 2 that a trough 72 is mounted at the rear of the tractor to extend from one stripping unit to the other, thereby to receive at each end the material elevated and discharged by the stripper conveyors 21. A conveyor shaft 73 extends from one end of the trough to the other and has a sprocket 74 mounted on one end thereof which extends through an end of the trough. A chain 75 surrounds this sprocket and a smaller sprocket 76, mounted on the main drive shaft 37, previously mentioned. In this manner, the conveyor shaft 73 is operated.

Mounted on the conveyor shaft 73 is a pair of flights 77, being right and left hand, as shown in Figure 2. This is for the purpose of moving the material from each end of the trough 72 towards the middle where there is provided a receptacle 78 to receive it, preparatory to its being elevated by an endless spiked belt 79, operating over a lower roller 80 (Fig. 3) and an upper roller, not shown. A shaft 81 (Fig. 2) on which the roller 80 is mounted, extends from one side of the elevator chute 82 in which the belt 79 operates and is driven from the conveyor shaft 73 by means of a chain 83, shown only in Figure 3 in dotted lines. The conveyor trough and elevator chute 82 are supported by the rearwardly extending frame 43, previously described and which is supported from the brackets 14, earlier mentioned as being secured to the rear axle housing 12 of the tractor.

Important among the features of the invention is the fact that the stalks of a row themselves serve to orient the stripping units with respect to the row. This is effected by the suspension mounting illustrated in Figure 7 in detail. It is pointed out at this time that to avoid confusion, this mounting has been omitted from Figures 1 and 2 and is but partially shown in Figure 3.

The mounting consists of the suspension arms 84 which depend alongside and are bolted to the frame 18 and which are supported at their upper ends by a cross member 85. A collar 86 is formed midway between the ends of the cross member 85. A yoke 87 is mounted parallel to the member 85 and is provided with vertically aligned collars 88 and which are offset from the yoke to receive the collar 86 therebetween and in axially aligned relationship. A king pin 89 serves to pivotally connect the three collars together as shown and serves as a fulcrum about which the cross member 85 may swing in a limited arc.

The yoke 87 further has collars 90 at each end serving as bearings to receive the main drive shaft 37 and which supports the assembly. A bracket 91 is secured by means of bolts 92 to the transverse beam 16 and has outwardly turned and apertured ends 93 to receive the shaft 37 and which, incidentally, affords, with an identical and companion bracket on the opposite side of the tractor, the sole support of the main drive shaft 37.

It is apparent from the foregoing that the limited degree of oscillation of the frame 18 at its rear end, permitted by the suspension on the king pin 89 will allow the forward end of the frame to swing in an arc sufficient to compensate for any ordinary irregularities in plant or stalk alignment and in view of the ease in which the frame can be moved on the king pin 89, the stalks themselves, in entering between the curved guides 66 will bring the frame into such alignment that the stalks will freely enter between the stripping rollers 47.

In order that the stalks entering between the stripping rollers 47, at the forward end of the stripping units will be supported at their trunks throughout the stripping operation, a pair of guides 94 is provided, each consisting of a rod or pipe of small diameter or a metal strip which is connected rearwardly of the point where the frame 18 engages the ground and extends toward the rear of the machine a short distance and has its free end 95 turned upwardly, and outwardly, as shown in Figures 1 and 3. One of these guides is disposed on each side of the row of stalks, immediately below the rollers 47.

In operation, the tractor, with the two stripping units attached thereto as described, is driven down the rows of open cotton so that the guides 66 of each unit will straddle the row of stalks. As the stalks enter between the rollers 47, the rolling action thereof upwardly, aided by the roughened surfaces, will roll the cotton out of the burs and deposit it into the attendant conveyors 21 which carry it upward for discharge into the transverse conveyor 77. Of course, a certain amount of leaves, limbs, hulls and other foreign matter enters with the cotton but the peculiar action of the rollers keeps this matter at a minimum and such material of this type that remains in the cotton is readily extracted with modern cleaning equipment.

After having been discharged into the conveyor 77, the cotton at each end is moved thereby towards the middle where it is picked up and elevated by the belt 79 and deposited into a farm trailer, not shown, but connected to and transported by the tractor.

While the invention has been described with great particularity, it is, of course, obvious that certain changes and modifications can be made from time to time as fall within the meaning and scope of the appended claims without departing from the spirit and intent of the invention.

What is claimed is:

1. A cotton harvesting machine including an inclined frame adapted for sliding engagement with the ground at its forward end, a pair of guides having curved, confronting edges defining a passageway, one of said guides being yieldable with respect to the companion guide, a pair of relatively parallel rollers rotatably mounted in said frame and spaced apart to define a continuation of said passageway, a trough on each side of the roller assembly, means for rotating said rollers in counter directions, a coupling of resilient material connecting one of said rollers at one end to said driving means, a collar embracing the roller adjacent said resilient coupling and held under constant spring tension to maintain spaced relationship of said rollers, spring means for mounting the opposite end of said roller for yielding movement relative to its companion, a tapered conveyor disposed in said troughs below the axes of said rollers for receiving material harvested thereby and conveyor means for receiving the discharge of said tapered conveyors.

2. A cotton stripping machine including an inclined frame adapted for sliding engagement with the ground at its forward end, a pair of rollers having roughened surfaces rotatably mounted longitudinally in said frame and spaced apart to define a longitudinal passageway therebetween, means for driving said rollers, a resilient coupling connecting one of said rollers at one end thereof to its driving means, means for mounting the opposite end of said roller for yielding movement with respect to the adjacent roller, a trough on each side of the roller assembly, tapered conveyors disposed in said troughs, means for receiving the discharge of said conveyors for disposition and means for suspending said frame for oscillating movement on vertical and horizontal planes.

3. In a cotton stripping machine, an inclined frame, means for suspending said frame at its approximate center of gravity for limited oscillating movement on vertical and horizontal planes, a pair of elongated stripping rollers disposed longitudinally in said frame, a length of resilient, tubular material forming a continuation of the shaft of one of said rollers at its upper end, spring means at the end of said roller opposite said tubular material and cooperating with the latter to cause said roller to yield to material passing between the same and its companion roller, a trough on each side of said pair of rollers, a tapered flight conveyor rotatably mounted in each of said troughs, a transverse conveyor for receiving the discharge of said flight conveyors and means for simultaneously operating said rollers and conveyors.

4. In a cotton stripping machne, an inclined frame adapted for attachment to a tractor, a centrally pivoted cross-head for suspending said frame for limited oscillation on horizontal and vertical planes, spaced knurled rollers arranged in said frame for jointly engaging cotton stalks advancing therebetween to extract material therefrom, a trough in said frame on each side and below the roller assembly, tapered conveyors disposed in said troughs for receiving and disposing of said material, a resilient coupling forming a continuation of the shaft at the upper end of one of said rollers yielding to lateral pressure imposed on said roller, spring means against which the opposite end of said roller bears and adapted to yield to the pressure of material entering between said rollers, and means for driving said rollers and conveyors.

5. In a cotton stripping machine, an inclined frame having closed sides, a pair of relatively parallel rollers mounted in said frame and having roughened surfaces, means for driving one of said rollers, means for imparting rotation from the driven roller to the shaft of the companion roller, a coupling of resilient material joining one end of said companion roller, connecting the same to its shaft, a spring bearing against the opposite end of said latter roller adapted to yield to material entering between said rollers, a trough on each side of and below said rollers, a tapered conveyor in each of said troughs, and a centrally pivoted cross-head for suspending said machine for limited oscillation by cotton stalks entering between said rollers.

6. A machine as set forth in claim 5 in which the flexible coupling is comprised of a length of rubber tubing forming a connection between the upper end of one of the pair of rollers and its shaft, and means for controlling the flexural movement of said coupling.

7. A structure as set forth in claim 5 in which the yieldable means for one of the pair of rollers is comprised of a spring controlled rod, pivoted at one end to the lower end of said roller and adapted to return the end of said roller to normal position when displaced relative to the other roller.

8. A machine as set forth in claim 5 in which the machine suspension means consists of a yoke and cross-member having respectively horizontal and vertical points of suspension and joined together at said latter point to support said machine for oscillative movement horizontally and vertically.

9. A machine as set forth in claim 5 in which the space intermediate the rollers is opposed by stalk guides connected at their forward ends to the frame and extending rearwardly therebelow and terminating in free, upturned ends.

CLAUDE T. BOONE, Sr.